(12) United States Patent
Barnett et al.

(10) Patent No.: US 9,083,242 B2
(45) Date of Patent: Jul. 14, 2015

(54) INTERLEAVED LLC CONVERTER EMPLOYING ACTIVE BALANCING

(75) Inventors: Rick L. Barnett, Dallas, TX (US); Raghothama Reddy, Murphy, TX (US)

(73) Assignee: General Electric Company, Schenectady, NY (US)

( * ) Notice: Subject to any disclaimer, the term of this patent is extended or adjusted under 35 U.S.C. 154(b) by 845 days.

(21) Appl. No.: 13/218,938

(22) Filed: Aug. 26, 2011

(65) Prior Publication Data

US 2012/0153730 A1 Jun. 21, 2012

Related U.S. Application Data

(60) Provisional application No. 61/424,351, filed on Dec. 17, 2010.

(51) Int. Cl.
*H02J 1/00* (2006.01)
*H02J 3/00* (2006.01)
*H02M 3/28* (2006.01)

(52) U.S. Cl.
CPC ..................................... *H02M 3/285* (2013.01)

(58) Field of Classification Search
CPC ....................................................... H02M 3/285
USPC ....................... 307/43, 82; 323/207, 225, 272; 363/21.02, 69
See application file for complete search history.

(56) References Cited

U.S. PATENT DOCUMENTS

| 2010/0123450 | A1 | 5/2010 | Reddy et al. | |
| 2011/0080146 | A1* | 4/2011 | Li et al. | 323/237 |
| 2011/0089913 | A1* | 4/2011 | Li et al. | 323/208 |
| 2012/0274298 | A1* | 11/2012 | Colbeck et al. | 323/282 |

OTHER PUBLICATIONS

Figge, H. et al., "Paralleling of LLC Resonant Converters Using Frequency Controlled Current Balancing," White Paper 2008 IEEE, pp. 1080-1085.

Orietti, E. et al., "Two-Phase Interleaved LLC Resonant Converter with Current-Controlled Inductor," White Paper 2009 IEEE, pp. 298-304.

* cited by examiner

*Primary Examiner* — Rexford Barnie
*Assistant Examiner* — Rasem Mourad
(74) *Attorney, Agent, or Firm* — General Electric Company

(57) ABSTRACT

An interleaved LLC converter, a method of operating an LLC converter and a power supply are disclosed herein. In one embodiment, the LLC converter includes: (1) a plurality of LLC power channels, with each of the plurality having an independent power input and (2) a compensation controller configured to actively adjust the independent power inputs to substantially match output voltage and current levels for a given load condition and a common operating frequency of the plurality of LLC power channels.

17 Claims, 6 Drawing Sheets

INTERLEAVED LLC CONVERTER EMPLOYING ACTIVE BALANCING

CROSS-REFERENCE TO RELATED APPLICATION

This application claims the benefit of U.S. Provisional Application Ser. No. 61/424,351, filed by Rick L. Barnett, et al., on Dec. 17, 2010, entitled "INTERLEAVED LLC CONVERTER USING ACTIVE BALANCING," which is incorporated herein by reference in its entirety.

TECHNICAL FIELD

The invention is directed, in general, to an inductor-inductor-capacitor ("LLC") power converter, and more specifically, to a plurality of interleaved LLC power converters.

BACKGROUND

LLC power converters are becoming an important part of power conversion systems. LLC power converters have a number of advantages when compared to other power converters. These advantages may include high efficiency, zero voltage switching on primary switches across the entire output load range, and lower electromagnetic emissions. LLC power converters can also operate at higher switching frequencies than many other forms of power converters, which can in turn lower the size of magnetics in LLC power converters.

In some applications, LLC power converters may be interleaved. Interleaving power converter stages can provide additional output power capability while minimizing the input and output filtering capacitance. However, disadvantages can also arise when interleaving LLC power converters. One disadvantage when interleaving LLC power converters is the inability to current share between the power stage channels when the resonant components are not well matched. The mismatches may result, for example, from differences in the values caused by manufacturing or temperature variations.

SUMMARY

In one aspect, the disclosure provides an interleaved LLC converter. In one embodiment, the LLC converter includes: (1) a plurality of LLC power channels, with each of the plurality having an independent power input and (2) a compensation controller configured to actively adjust the independent power inputs to substantially match output voltage and current levels for a given load condition and a common operating frequency, of the plurality of LLC power channels.

In yet another aspect, a method of operating a LLC converter having a first and a second LLC power channel is provided. In one embodiment the method includes: (1) generating, at a first LLC power stage of the first LLC power channel, a first DC power output from a first independent power input, (2) generating, at a second LLC power stage of the second LLC power channel, a second DC power output from a second independent power input, (3) actively adjusting the first and second power inputs to substantially match output voltage and current levels for a given load condition and a common operating frequency, between the first and the second LLC power stages and (4) interleaving the first DC power output and the second DC power output to provide output power for the LLC converter.

In still another aspect, the disclosure provides a power supply. In one embodiment the power supply includes: (1) a first LLC power channel having a first LLC power stage and a first dedicated power source configured to generate a first independent power input for the first LLC power stage, (2) a second LLC power channel having a second LLC power stage and a second dedicated power source configured to generate a second independent power input for the second LLC power stage, wherein outputs of the first and the second LLC power stages are interleaved and (3) a compensation controller configured to actively adjust the first and the second independent power inputs to substantially match output voltage and current levels for a given load condition and a common operating frequency of the first and the second LLC power stages.

BRIEF DESCRIPTION

Reference is now made to the following descriptions taken in conjunction with the accompanying drawings, in which.

DETAILED DESCRIPTION

Figure 1:
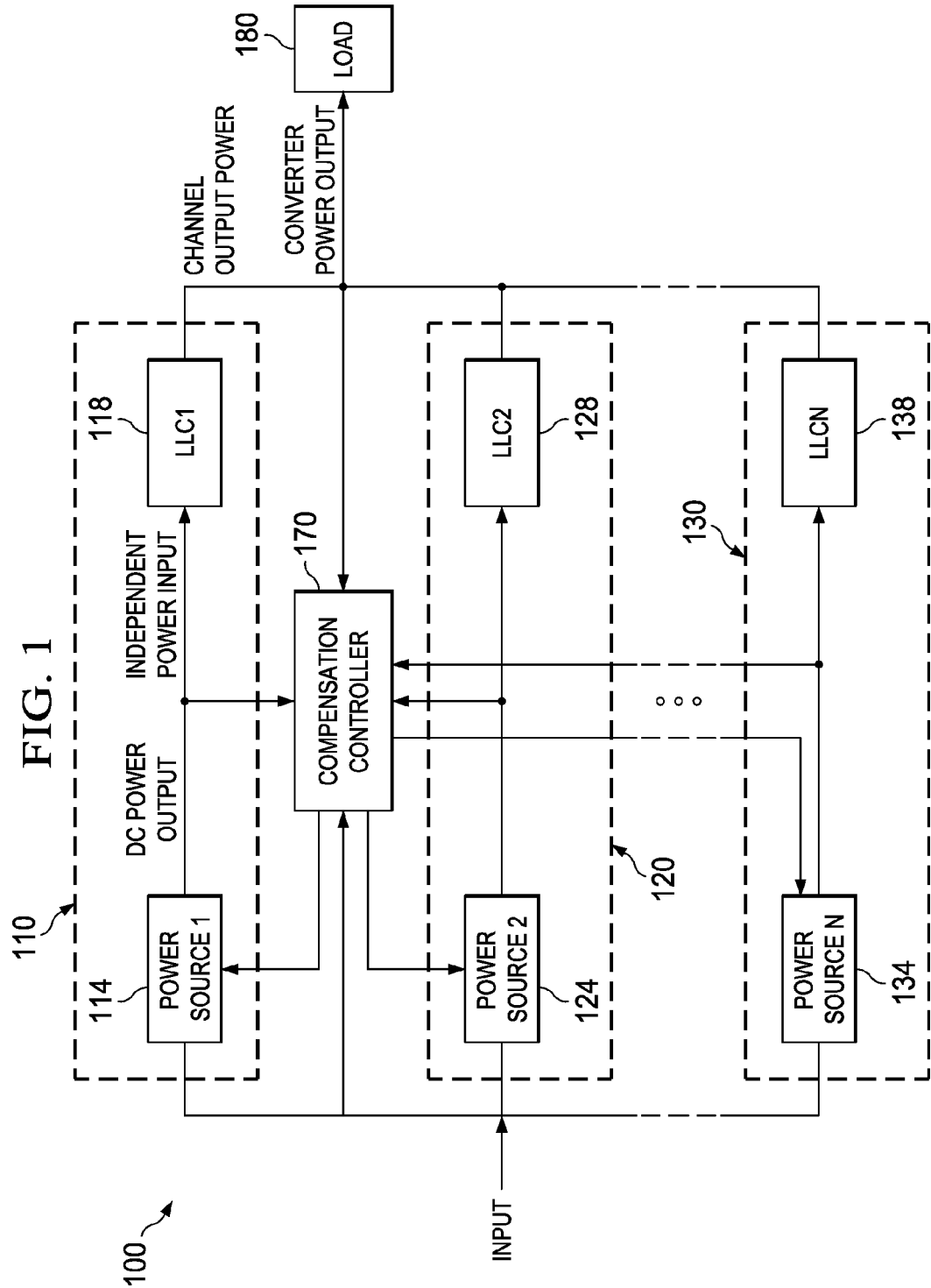
FIG. 1 is an illustration of a block diagram of an embodiment of an interleaved LLC power converter constructed according to the principles of the disclosure.

The disclosure describes the use of an active balance technique for multiple power channels of an interleaved LLC converter. The active balance technique may compensate for the relative tolerances between the multiple interleaved power stage channels by actively modulating independent power inputs for the LLC power stages of the power channels until the plant output voltages and currents are matched for the given operating condition. The independent power inputs are dedicated power inputs for each particular LLC power stage. In one embodiment, the independent power input is a dedicated voltage level for each LLC power stage. The independent power input may be modulated by varying the output of existing pre-regulators of the power channels. As such, in some embodiments, additional regulation stages are not required.

The active balance technique disclosed herein can compensate for variations in the DC gain associated with each channel due to variations of the resonant components. This active balancing technique will compensate for unequal sharing between the channels caused by differences in values of the resonant components, temperature variations, operating conditions, and other factors which may cause the channels to be dissimilar. Accordingly, the active balance technique actively adjusts the independent power inputs of each LLC power stage to substantially match output voltage and current levels for a given load condition and a common operating frequency. The pre-regulator output voltages (e.g., PFCs) are adjusted by controls to levels to achieve current/power balance in the LLC stages. The levels adjusted to most likely are not equal. The active balance technique may also control the pre-regulator output currents to be equal. In this case, the pre-regulator output voltages are floated or allowed to fly in order to have balanced LLC's. Thus, the active balance technique actively adjusts (or margins) the output voltage of each pre-regulator to actively balance the currents and voltage of the LLC stages. Adjusting may be performed by moving the pre-regulator output up and down from a standard operating point.

The active balance technique may employ standard, low cost resonant components and does not necessarily require an extra pre-regulator stage. Standard resonant components are typically less expensive than tight tolerance components. Additionally, having no extra pre-regulator stages may result in greater efficiency. The disclosed active balancing technique is applicable, but not limited to, high efficiency rectifiers with nominal output voltages of 12V & 48V and is well suited for low output voltage and high current applications.

In an interleaved LLC converter, the phase angles between the multiple power channels are appropriately shifted to minimize current ripple in the filter capacitor across Vo of the converter. For an interleaved LLC converter having two channels, the phase of the second channel is shifted by ninety degrees. When additional channels are added, the phase angle between each of the channels of the interleaved LLC converter changes. For example, for three channels, each channel is shifted by sixty degrees with respect to the previous one. "N" channels would mean each channel is shifted by 180/N degrees with respect to the previous one.

FIG. 1 is an illustration of a block diagram of an embodiment of an interleaved LLC power converter 100 constructed according to the principles of the disclosure. The converter 100 may be an AC to DC converter that receives an AC input and generates a DC output. The converter 100 includes a plurality of LLC power stages with each of the plurality having a power input that is independent of a power input of the remaining plurality of LLC power stages. Thus, each LLC power stage receives an independent power input. In FIG. 1, three LLC power stages are illustrated. However, one skilled in the art will understand that the converter 100 may include more than three LLC power stages as represented by the dashed lines. Additionally, one skilled in the art will understand that the LLC power converter 100 may include additional components that are not illustrated or discussed but are typically included in conventional LLC converters.

The converter 100 is configured to provide DC power to a load 180. The converter 100 includes three power channels 110, 120 and 130. Each of the power channels 110, 120, 130, includes a dedicated power source and an LLC power stage. Power channel 110 includes power source 114 and LLC 118. Power channel 120 includes power source 124, LLC2 128, and power channel 130 includes power source 134, LLC3 138. The power source for each power stage channel generates a DC output that is provided as an independent power input for the corresponding LLC power stage. Each generated DC output of the dedicated power sources is independent of generated outputs from the power sources of the other power channels. Thus, each generated output is an independent DC output that provides a dedicated DC power input for each of the corresponding LLC power stages. For example, power source 114 generates a DC power output that provides an independent power input for LLC 118.

As noted above, each power source 114, 124, 134, provides a dedicated DC power input to their respective LLC power stages LLC 118, LLC 128 and LLC 138. In some embodiments, the power sources 114, 124, 134, may receive an AC input power and generate therefrom a DC output voltage. The AC input power may be a line power from, for example, a wall outlet. A single bridge rectifier may be used for each of the power sources 114, 124, 134. In other embodiments, a bridge rectifier may be shared by two or more of the power sources 114, 124, 134. The bridge rectifier may be a bridgeless or a full-bridge rectifier. The power source may also be a DC/DC power stage.

The DC power generated by a single or shared bridge rectifier may be supplied to a pre-regulator of each power source. As such, each of the power sources 114, 124, 134, may include a dedicated pre-regulator. The pre-regulator may be, for example, a power factor correcting (PFC) circuit. The PFC circuits or the pre-regulators may be conventional components that are typically employed in LLC converters.

Each LLC power stage 118, 128, 138, generates a channel output from their independent power input. The LLC power stages 118, 128, 138, may be conventional LLC converters. The channel output of each of the LLC power stages 118, 128, 138, are interleaved together (connected in parallel) to provide the converter power output to the load 180.

The compensation controller 170 is configured to actively adjust the independent power inputs of each LLC power stage 118, 128, 138, to substantially match output voltage and current levels for a given load condition and a common operating frequency, of the plurality of LLC power stages 118, 128, 138. The compensation controller 170 may be a dedicated computing device that is constructed to substantially match the output voltage and current levels for a given load condition and a common operating frequency, of the LLC power stages 118, 128, 138. To perform the described functions, the compensation controller 170 may be embodied as a series of operating instructions stored on a non-transitory computer-readable medium that directs the operation of a processor when initiated thereby. Accordingly, the compensation controller 170 may include a processor and an associated memory. In one embodiment, the compensation controller 170 may be a dedicated computing device including the necessary circuitry (including a processor and memory) and/or software to perform the described functions. The compensation controller 170 may be a software/firmware module that is deployed or integrated within a computing device that is configured to perform other functions, such as, for the converter 100.

In one embodiment, the compensation controller 170 is configured to actively adjust the independent power inputs by modulating at least one of the dedicated power sources 114, 124, 134. In some embodiments, multiple of the power sources 114, 124, 134, may be modulated to actively adjust the power inputs. The compensation controller 170 may modulate a power source by controlling a power switch of the power source. In one embodiment, the compensation controller 170 may modify the duty cycle of a power source. For example, each of the power sources 114, 124, 134, may include a dedicated pre-regulator with a power switch. The compensation controller 170 may modify the duty cycle of the power switch to control the DC power output of the power sources 114, 124, 134. The compensation controller 170 may modulate a power source based on an input current of the LLC power stages 118, 128, 138. In some embodiments, analog hardware controls may be employed to perform the functions of the compensation controller 170.

Figure 5:
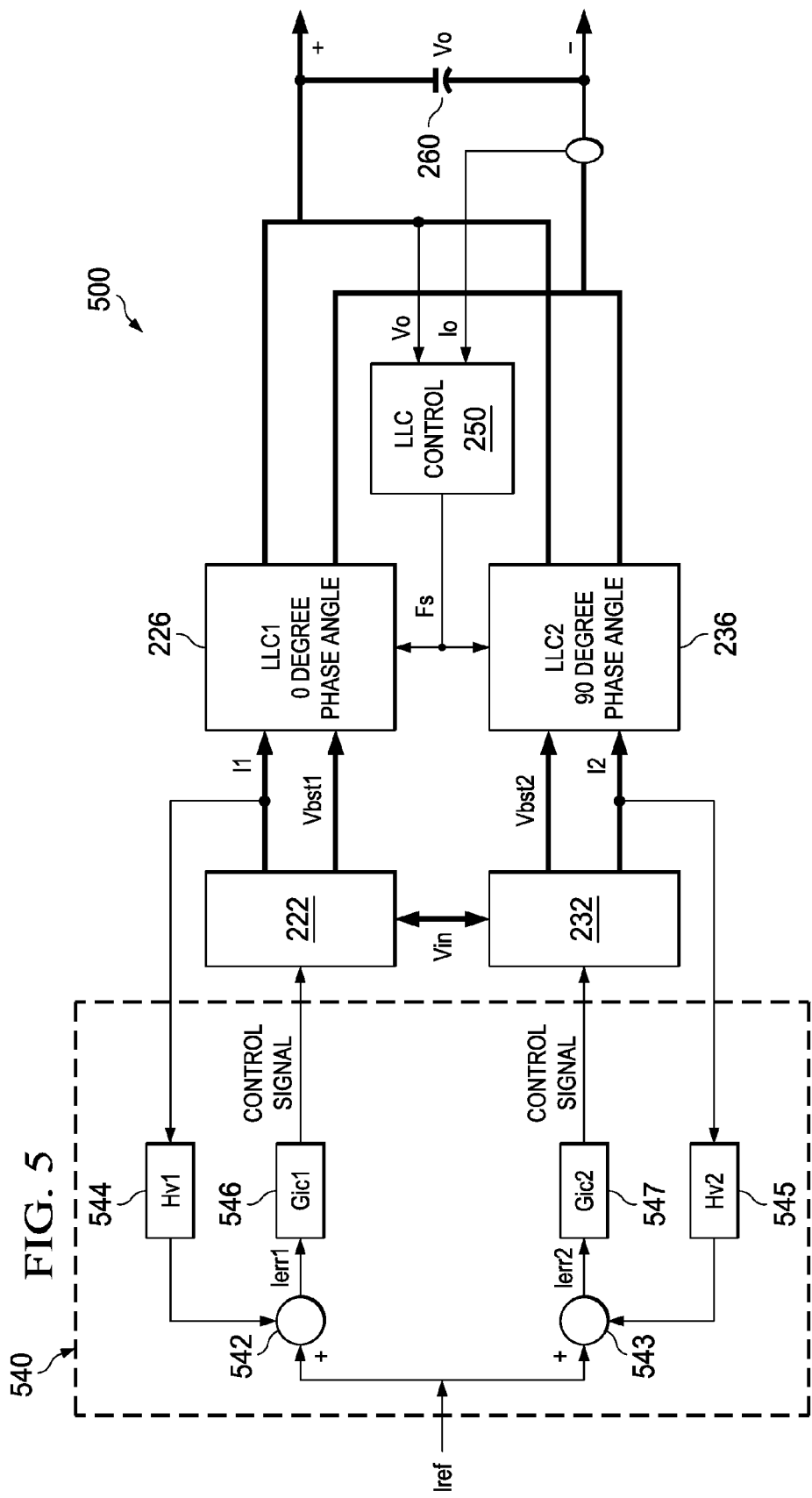
FIG. 5 is an illustration of a block diagram of still another embodiment of an LLC power converter constructed according to the principles of the disclosure.

In another embodiment, the compensation controller 170 may by configured to actively adjust the independent power inputs by regulating input currents of the LLC power stages 118, 128, 138, to the same or at least substantially the same level. The input currents may be regulated by a closed feedback loop coupled to the compensation controller 170. FIG. 5 illustrates an embodiment of LLC converters that actively balance output voltage and current levels for a given load condition and a common operating frequency by regulating the input currents of LLC power stages.

Figure 2:
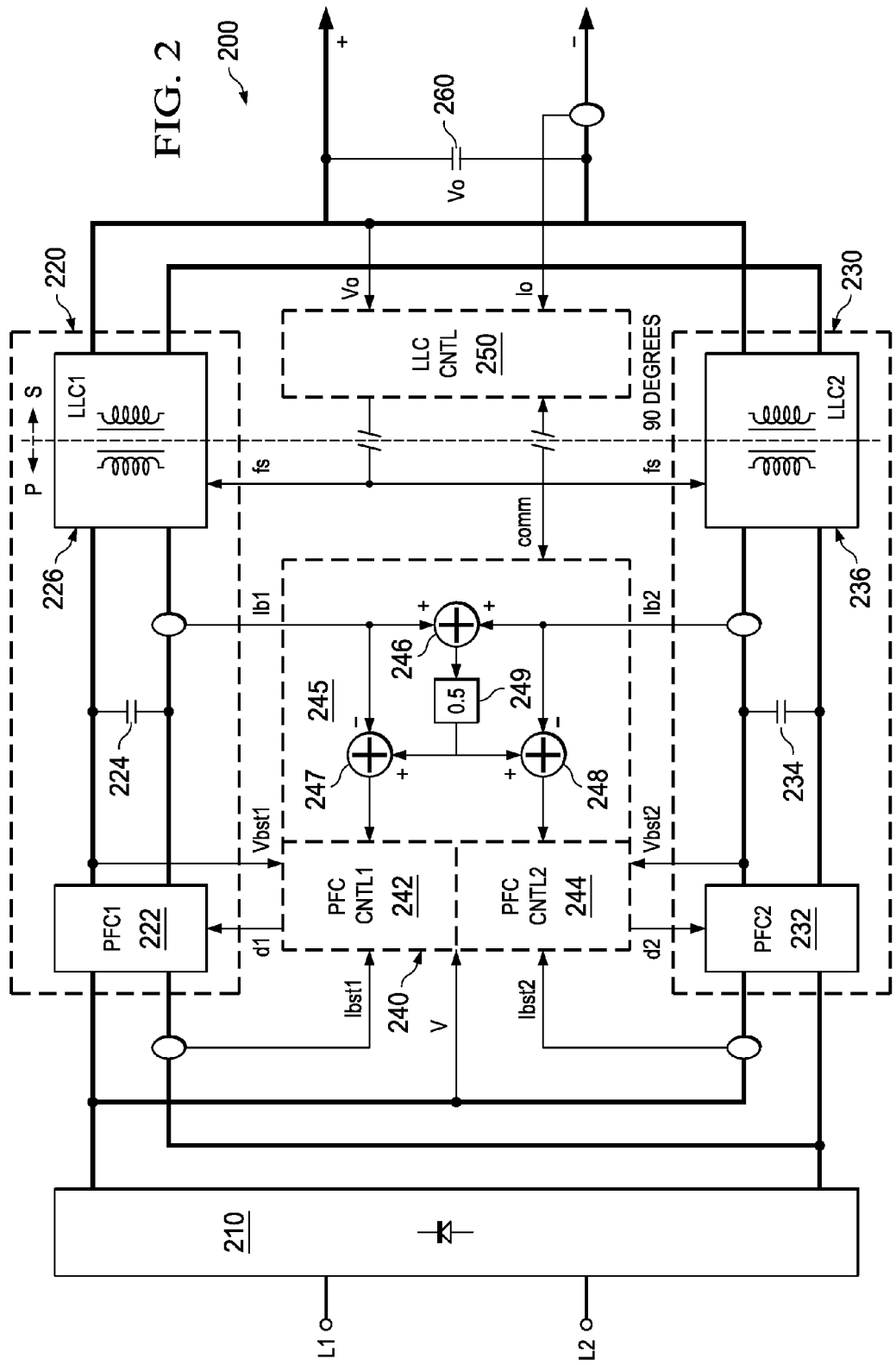
FIG. 2 is an illustration of a schematic diagram of another embodiment of an interleaved LLC power converter constructed according to the principles of the disclosure.

FIG. 2 is an illustration of a block diagram of another embodiment of an interleaved LLC power converter 200 constructed according to the principles of the disclosure. The LLC power converter 200 is an example of a converter that actively balances DC gain by modulating a power input for each LLC stage. The converter 200 includes a converter DC power source 210, a first power channel 220, a second power channel 230, a compensation controller 240, a LLC controller 250 and an output filter capacitor 260.

The converter power source 210 is configured to receive AC power and generate DC power. In FIG. 2, the converter power source 210 is a full wave bridge rectifier that receives AC power, L1 and L2 (i.e., line 1 and line 2) and generates DC power that is provided to both the first power channel 220 and the second power channel 230. In some embodiments, the converter power source 210 may be a bridgeless rectifier. In other embodiments, a DC input may be received and a DC/DC stage employed to provide power to the first power channel 220 and the second power channel 230.

The first power channel 220 includes a first dedicated power source 222, a first DC link capacitor 224 and a LLC power stage 226. The first dedicated power source 222 receives the DC power from the converter power source 210 and conditions the DC power to provide to the first DC link capacitor 224. In the illustrated embodiment, the first dedicated power source 222 is a PFC circuit for the first power channel 220. The DC link capacitor 224 links the first stage of the power channel 220, the PFC stage, to the second stage of the power channel 220, the LLC power stage 226. The LLC power stage 226 receives the conditioned DC output power and generates a first channel output power. The first dedicated power source 222, the DC link capacitor 224 and the LLC power stage 226 may be conventional components. The second power channel 230 includes a second dedicated power source 232, a second DC link capacitor 234 and a LLC power stage 236. Each of these components operate similarly as the corresponding components of the first power channel 220 described above.

The compensation controller 240 is configured to actively adjust the independent power inputs to the LLC power stages 226, 236, to substantially match output voltage and current levels for a given load condition and a common operating frequency, thereof. By adjusting the independent power inputs, the compensation controller 240 can compensate for differences in values of the resonant components of the LLC power stages 226, 236, temperature variations, operating conditions and other factors which may cause the first and second power channels 220, 230, to be dissimilar. Compensating for the differences between the first power channel 220 and the second power channel 230 allows employing standard, lower cost resonant components compared to more expensive resonant components that are manufactured with tight tolerances.

The compensation controller 240 includes a first modulator 242, a second modulator 244 and balancing circuitry 245. The first modulator 242 and the second modulator 244 provide independent control loops for the first dedicated power source 222 and the second dedicated power source 232, respectively, to modulate the magnitude of the independent and dedicated power sources of each power channel 220, 230, to obtain equal or at least substantially equal output voltage and current levels for a given load condition and a common operating frequency, of the LLC power stages 226, 236. Each of the first modulator 242 and the second modulator 244 generate a duty cycle (i.e., d1 and d2 in FIG. 2) for the respective switches of the first dedicated power source 222 and the second dedicated power source 232 to control the modulation thereof. Each of the modulators 242, 244, receive operating parameters from their corresponding power channel and balancing inputs from the balancing circuitry 245 to determine the duty cycles d1, d2. Additionally, both modulators 242 and 244 receive the input voltage V from the 210. Based on these operating parameters, the modulators 242, 244, generate the duty cycles d1, d2, to adjust the independent power input to the LLC power stages 226, 236.

For example, the first modulator 242 receives the input current Ibst1 and the input voltage V from the 210. The first modulator 242 also receives the balancing input from balancing circuitry 245 and the output voltage Vbst1 from the first dedicated power source 222. The first modulator 242 compares the input power parameters, Ibst1 and V, to the output voltage Vbst1 and the desired output current represented by the balancing input. Based on the comparison, the modulator 242 determines the needed duty cycle for the first dedicated power source 222 to generate the desired output current that is provided to the LLC power stage 226. The modulator 244 operates similarly to generate the duty cycle d2 employing the operating parameters of the second power channel 230. The first dedicated power source 222 and the second dedicated power source 232 employ the duty cycles d1, d2, to provide an equal or at least substantially equal Ib1 and Ib2. The balancing inputs generated by the balancing circuitry 245 represent the desired input current (i.e., desired Ib1 and Ib2). Ibst1, Ibst2, V, Vbst1, Vbst2 and the communication signal of the LLC controller 250 are all used in normal operation of a conventional interleaved LLC power converter and are illustrated for clarity in FIG. 2. Unlike conventional interleaved LLC power converters, the interleaved LLC power converter 200 compares Ib1 to Ib2, then based on this comparison, the magnitude of Vbst1 and Vbst2 are margined or adjusted until the LLC power stages 226, 236, draw equal currents.

The balancing circuitry 245 includes three summers, 246, 247, 248, and an averager 249. The first summer 246 receives the input currents Ib1 and Ib2, adds these currents together and provides the total value of the two currents Ib1, Ib2, to the averager 249. The averager 249 is a gain stage of 0.5 that is configured to divide the total value of the two currents Ib1, Ib2, to generate an average current value. The summer 247 determines the difference between the average current value and Ib1 and provides this first balancing input to the modulator 242. The summer 248 similarly determines the difference between the average current value and Ib2 and provides this second balancing input to the modulator 244. As noted above, the modulators 242, 244, employ the first and second balancing inputs to generate the duty cycles d1, d2, to balance Ib1 and Ib2. Balancing of Ib1 and Ib2 may be achieved by different components or arrangements in other embodiments.

The LLC controller 250 generates control signals for the LLC power stages 226, 236, based on feedback signals (i.e., output power of the converter 200, Vo and Io) at the output filter capacitor 250. As illustrated in FIG. 2, the control signals may be frequency control signals for the LLC power stages 226, 236. For interleaving, the LLC power stages 226, 236, are run at the same frequency with one phase shifted by 90 degrees with respect to the other. Both the LLC controller 250 and the output filter capacitor 260 may be conventional components that are typically employed with LLC converters.

Figure 3:
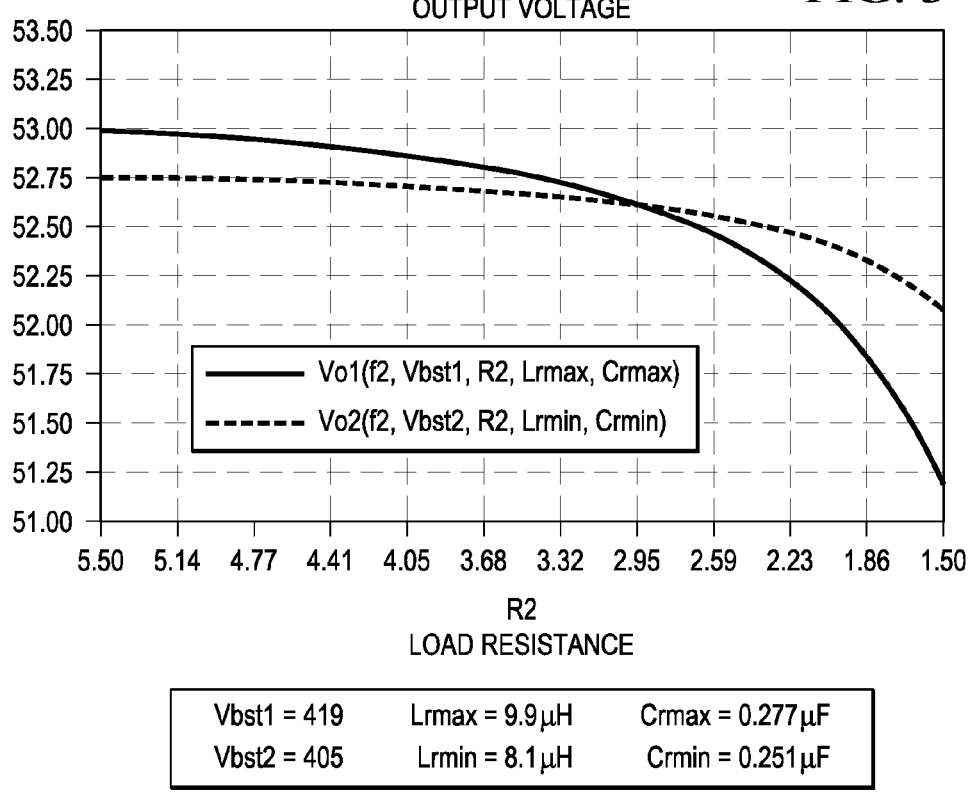
FIG. 3 illustrates a graph of an example of an output voltage of two interleaved LLC power converters constructed according to the principles of the disclosure.

FIG. 3 illustrates a graph of an example of output voltage characteristics of two LLC converters constructed according to the principles of the disclosure. The graph of FIG. 3 represents matching or substantially matching output voltage and current levels for a given load condition and a common operating frequency of LLC stages, such as in, for example, the LLC converter 200 of FIG. 2. The y-axis of the graph is the output voltage of the LLC converter and the x-axis is the load resistance. In FIG. 3, the graph represents two output voltage characteristic curves Vo1 and Vo2, of the two LLC power channels. By dynamically modulating the voltage magnitude of input sources of each LLC power stage (i.e., an LLC DC/DC output stage), the characteristic curves of each LLC power stage can be lined up such that the programmed output voltage (and therefore output currents) remain aligned and balanced as load resistance condition changes. The characteristic curves for the two voltages Vo1 and Vo2 are illustrated with L and C tank values at the extremes of tolerance bands, frequency fixed at 143 kHz and a load resistance of 2.95. The independent input voltages, Vbst1 and Vbst2, for the LLC power stages are adjusted to 419 volts and 405 volts respectively, resulting in characteristic curves that intersect at 2.95 ohms. The paralleled outputs of the two LLC power stages will then share output current and power equally at this load condition. The values of the various components used for the simulation to generate the graph of FIG. 3 are provided therein.

Figure 4:
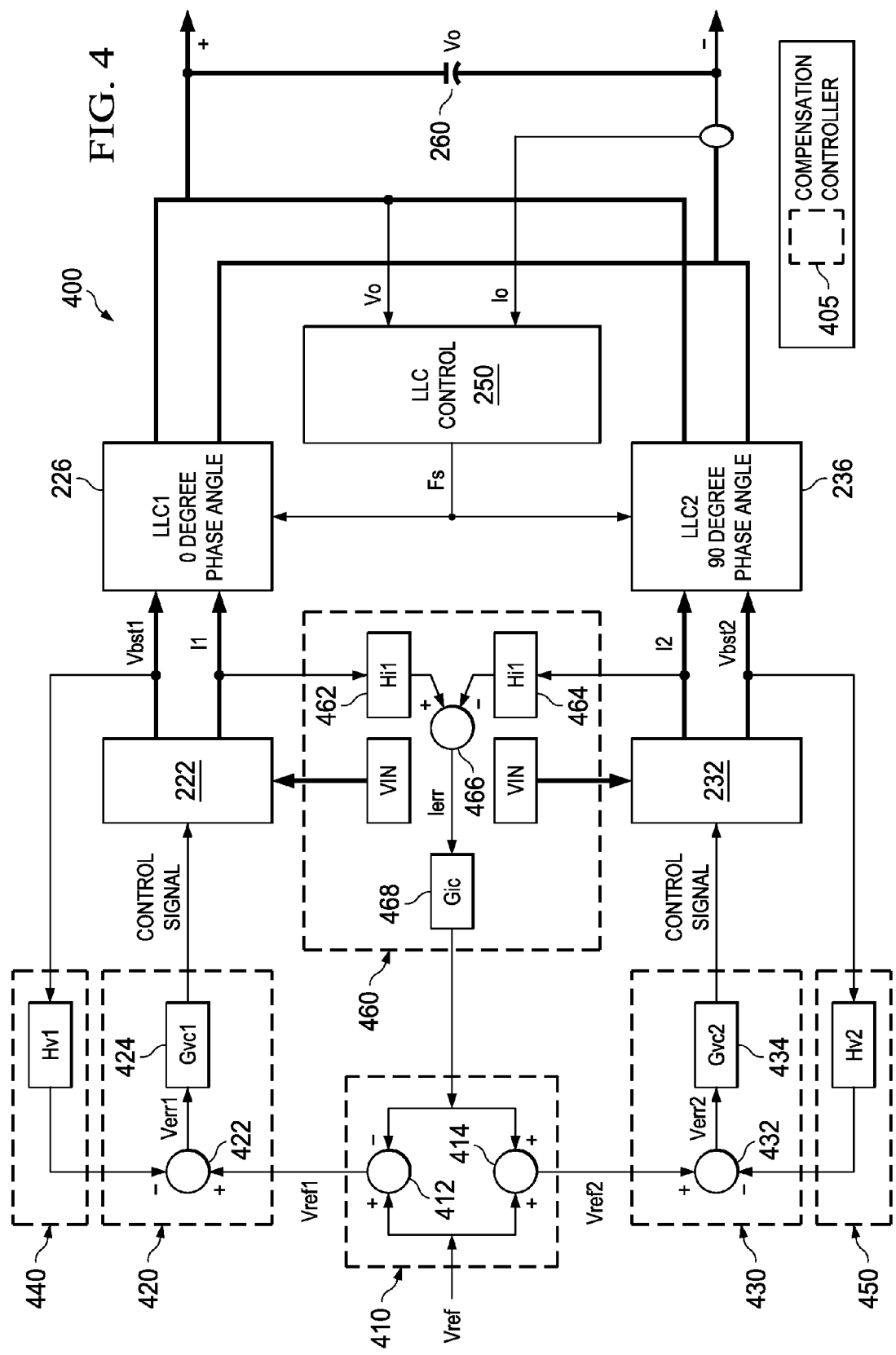
FIG. 4 is an illustration of a block diagram of yet another embodiment of an LLC power converter constructed according to the principles of the disclosure.

FIG. 4 is an illustration of a block diagram of yet another embodiment of an LLC power converter 400 constructed according to the principles of the disclosure. As with the LLC converter 200, the LLC power converter 400 includes two power channels with similar components that may operate as described with respect to FIG. 2. Additionally, the LLC converter 400 includes a compensation controller 405. FIG. 4 provides detail on the relevant control loops of the first dedicated power source 222 and the second dedicated power source 232. The compensation controller 405 includes a reference voltage generator 410, a first channel voltage compensator 420, a second channel voltage compensator 430, a first channel feedback circuit 440, a second channel feedback circuit 450 and a current balance controller 460. The reference voltage generator 410 is configured to receive a reference voltage having a desired value and corrected current signal. The reference voltage may be, for example, the value that you want Vbst1 programmed to be. It could also be a scaled representation of the desired value. The reference voltage generator 410 includes a first summer 412 and a second summer 414 that receive the corrected current signal and the reference voltage and provide therefrom a reference voltage for the first channel 420 and the second channel 430. The first channel voltage compensator 420 includes a summer 422 and circuitry 424. The summer 422 combines the first reference voltage with a first voltage feedback signal from the first channel feedback circuit 440. From the combination, the summer 422 provides a first voltage error signal. The first channel circuitry 424 receives the first voltage error signal and generates a control signal for the dedicated power source 222. The first channel feedback circuit 440 senses the DC output voltage Vbst1 of the dedicated power source 222. The second channel voltage generator 430 includes a summer 432 and second channel circuitry 434. The second channel voltage compensator 430 and the second channel feedback circuit 450 perform similarly to the first channel voltage compensator 420 and the first channel feedback circuit 440 with respect to the second LLC channel 230.

The current corrector 460 includes a feedback circuit 462 and a feedback circuit 464 that provide the sensed output currents, I1 and I2, of the dedicated power sources 222, 232, to a summer 466 of the current controller 460. The currents I1 and may be sensed at various locations associated with the dedicated power sources 222 and 232. The summer 466 generates a current error signal is provided to current balance compensation 468 of the current controller 460. The current balance compensation 468 provides the corrected current signal that is provided to the reference voltage generator 410.

FIG. 5 is an illustration of a block diagram of still another embodiment of an LLC power converter 500 constructed according to the principles of the disclosure. As with the LLC power converter 400, the LLC power converter 500 includes similar components to the LLC power converter 200. These components are similarly denoted in FIG. 5. Additionally, the LLC converter 500 includes a compensation controller 540 that is configured to regulate input currents of the LLC power channels 226, 236, to actively balance the independent power inputs. The compensation controller 540 includes a first channel summer 542, a current feedback circuit 544 and current compensation 546. The first channel summer 542 receives a reference current and a sensed current of the dedicated power source 222. The first channel summer 542 compares the sensed current to the reference current to generate a current error signal that is provided to the current compensation 546. Therefrom, the current compensation network 546 provides a control signal for the dedicated power source 222, so that I1 is controlled.

The compensation controller 540 also includes similar components that are configured to similarly provide a control signal for the second dedicated power source 232. These components include a second channel summer 543, a current feedback circuit 545 and current compensation 547. In this embodiment, the compensation controller 540 regulates the input current to the LLC power stages 226 and 236 to equal levels. The input voltages for the LLC power stages 226 and 236, however, are unregulated and will float to where needed in order to accommodate the programmed I1 and I2.

Figure 6:
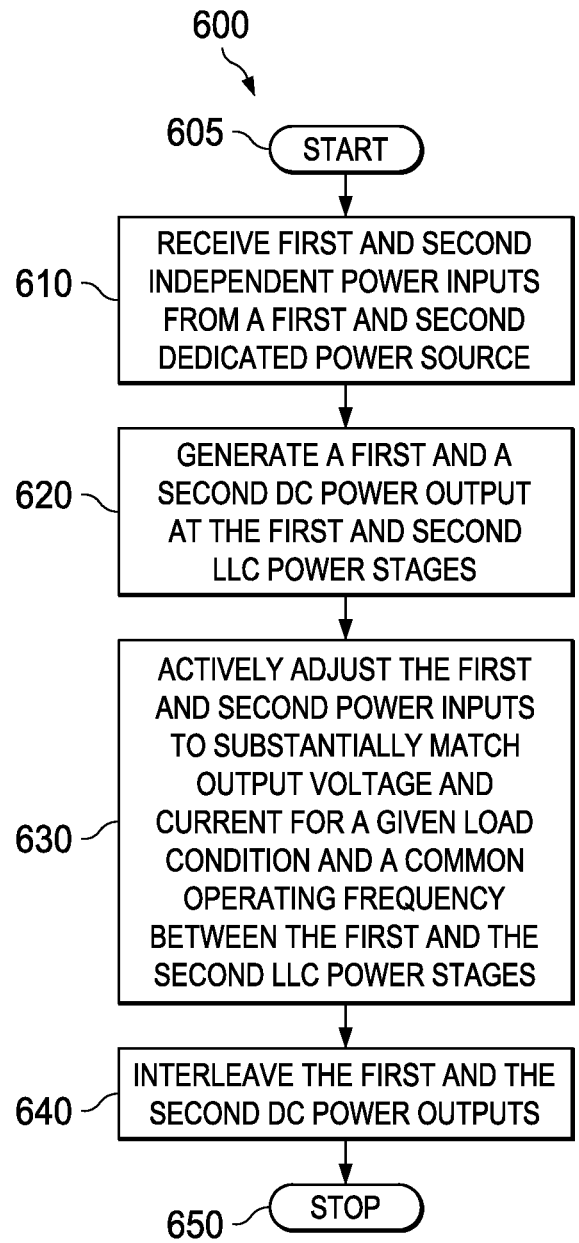
FIG. 6 is an illustration of a flow diagram of an embodiment of a method of operating an interleaved LLC power converter carried out according to the principles of the disclosure.

FIG. 6 is a flow diagram of an embodiment of a method 600 of operating an interleaved LLC power converter carried out according to the principles of the disclosure. The method begins in a step 605.

In a step 610, a first independent power input and a second independent power input are received from a first dedicated power source and a second dedicated power source, respectively. A first DC power output and a second DC power output are generated at a first and second LLC power stage, respectively, in a step 620.

In a step 630, the first and second power inputs are actively adjusted to substantially match output voltage and current levels for a given load condition and a common operating frequency between the first and the second LLC power stages. In one embodiment, the first and second power inputs are modulated to obtain the substantial match. The first and second DC power outputs are interleaved in a step 640. The method 600 then ends in a step 650.

Those skilled in the art to which this application relates will appreciate that other and further additions, deletions, substitutions and modifications may be made to the described embodiments. Additionally, one skilled in the art will understand that conventional components such as sensors may be used to sense the various currents and voltages that are employed by the various disclosed LLC converters.

Portions of the above-described apparatuses and methods may be embodied in or performed by various digital data processors or computers, wherein the computers are programmed or store executable programs of sequences of software instructions to perform one or more of the steps of the methods e.g., a step or steps of the methods or processes of FIG. 6. The software instructions of such programs may represent algorithms and be encoded in machine-executable form on conventional digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods. Accordingly, computer storage products with a computer-readable medium, such as a non-transitory computer-readable medium, that have program code thereon for performing various computer-implemented operations that embody the tools or carry out the steps of the methods set forth herein may be employed. A non-transitory media includes all computer-readable media except for a transitory, propagating signal. The media and program code may be specially designed and constructed for the purposes of the disclosure, or they may be of the kind well known and available to those having skill in the computer software arts. An apparatus may be designed to include the necessary circuitry or series of operating instructions to perform a step or steps of the disclosed methods

What is claimed is:

1. An interleaved converter, comprising: a plurality of LLC power channels having a power input provided by a respective power source; and a compensation controller configured to actively adjust said power inputs to match output voltage and current levels for a given load condition and a common operating frequency of said plurality of LLC power channels, wherein said compensation controller is configured to adjust said power inputs by controlling said power sources based on a power source output voltage received at said compensation controller directly from each of said power sources wherein said compensation controller is configured to adjust said power inputs by controlling a first power source of said power sources using a first modulator in said compensation controller and controlling a second power source of said power sources using a second modulator in said compensation controller.

2. The interleaved converter as recited in claim 1 wherein each of said power sources is a boost pre-regulator.

3. The interleaved converter as recited in claim 2 wherein each said boost pre-regulator is a power factor correcting circuit.

4. The interleaved converter as recited in claim 1 wherein said compensation controller is configured to control said power sources based on input currents of said plurality of LLC power channels.

5. The interleaved converter as recited in claim 1 wherein said compensation controller is configured to regulate input currents of said plurality of LLC power channels to actively balance said plurality of LLC power channels.

6. A method of operating a converter having a first LLC power channel and a second LLC power channel, the method comprising:
generating, at a first LLC power stage of the first LLC power channel, a first DC power output from a first power input;
generating, at a second LLC power stage of the second LLC power channel, a second DC power output from a second power input;
receiving, at a compensation controller, a first power source output voltage directly from a first power source that generates the first power output;
receiving, at the compensation controller, a second power source output voltage directly from a second power source that generates the second power output;
adjusting, using the compensation controller, the first and second power inputs by controlling the first and second power sources to match output voltage and current levels for a given load condition and a common operating frequency between the first and the second LLC power stages; and
interleaving the first DC power output and the second DC power output to provide output power for the converter.

7. The method as recited in claim 6 wherein adjusting the first and second power inputs comprises controlling the first power source using a first modulator in the compensation controller and controlling the second power source using a second modulator in the compensation controller.

8. The method as recited in claim 6 wherein the first power source is a first boost pre-regulator for the first LLC power channel and the second power source is a second boost pre-regulator for the second LLC power channel.

9. The method as recited in claim 8 wherein the first boost pre-regulator is a power factor correcting circuit for the first LLC power channel and the second boost pre-regulator is a second power factor correcting circuit for the second LLC power channel.

10. The method as recited in claim 7 wherein said controlling the first and second power sources is based on input currents of the first and second LLC power channels.

11. The method as recited in claim 6 further comprising regulating input currents of the first and second LLC power channels to match the output voltage and current levels.

12. A power supply, comprising:
a first LLC power channel having a first LLC power stage and a first power source configured to generate a first power input for said first LLC power stage;
a second LLC power channel having a second LLC power stage and a second power source configured to generate a second power input for said second LLC power stage, wherein outputs of said first and said second LLC power stages are interleaved; and
a compensation controller configured to:
receive a first power source output voltage directly from said first power source;
receive a second power source output voltage directly from said second power source; and
adjust said first and said second power inputs to match output voltage and current levels for a given load condition and a common operating frequency of said first and second LLC power stages.

13. The power supply as recited in claim 12 wherein each of said first and second power sources is a boost pre-regulator.

14. The power supply as recited in claim 13 wherein each said boost pre-regulator is a power factor correcting circuit.

15. The power supply as recited in claim 12 wherein said compensation controller is configured to adjust said first and second power inputs by modulating a first voltage magnitude of said first power source using a first modulator and modulating a second voltage magnitude of said second power source using a second modulator.

16. The power supply as recited in claim 15 wherein said compensation controller is configured to perform the modulating by forcing equal input currents of said first and second LLC power channels.

17. The power supply as recited in claim 12 wherein said compensation controller is configured to match the output voltage and current levels by regulating input currents of said first and second LLC power channels.

* * * * *

UNITED STATES PATENT AND TRADEMARK OFFICE
CERTIFICATE OF CORRECTION

PATENT NO.       : 9,083,242 B2
APPLICATION NO.  : 13/218938
DATED            : July 14, 2015
INVENTOR(S)      : Barnett et al.

It is certified that error appears in the above-identified patent and that said Letters Patent is hereby corrected as shown below:

In the specification

In Column 4, Line 63, delete "may by" and insert -- may be --, therefor.

In Column 7, Line 57, delete "generator 430" and insert -- generator 410 --, therefor.

In Column 7, Line 65, delete "12," and insert -- I2, --, therefor.

In Column 7, Line 67, delete "may" and insert -- I2 may --, therefor.

In Column 8, Line 14, delete "channels 226, 236," and insert -- channels 220, 230, --, therefor.

In Column 8, Line 34, delete "12." and insert -- I2. --, therefor.

Signed and Sealed this
Twenty-second Day of December, 2015

Michelle K. Lee
*Director of the United States Patent and Trademark Office*